(12) United States Patent
Ohtani et al.

(10) Patent No.: US 8,717,167 B2
(45) Date of Patent: May 6, 2014

(54) EVENT DETECTION CONTROL METHOD AND SYSTEM

(75) Inventors: Takeshi Ohtani, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 12/754,302

(22) Filed: Apr. 5, 2010

(65) Prior Publication Data

US 2010/0259380 A1 Oct. 14, 2010

(30) Foreign Application Priority Data

Apr. 9, 2009 (JP) ................................. 2009-094969

(51) Int. Cl.
  *G08B 21/00* (2006.01)
(52) U.S. Cl.
  USPC ......... 340/540; 340/506; 340/507; 340/539.1
(58) Field of Classification Search
  CPC .......... G08B 3/10; G08B 25/14; G08B 21/00; G05B 9/02
  USPC ....................................................... 340/540
  See application file for complete search history.

(56) References Cited

U.S. PATENT DOCUMENTS 7,111,084 B2 * 9/2006 Tan et al. .......................... 710/15

FOREIGN PATENT DOCUMENTS

| JP | 1-197850 | | 8/1989 |
| JP | 4-360242 | | 12/1992 |
| JP | 8-12623 | | 2/1996 |
| JP | 2001-45021 | | 2/2001 |
| JP | 2004-280738 | | 10/2004 |
| JP | 2006-285336 | | 10/2006 |
| JP | 2006285336 | A * | 10/2006 |
| JP | 2008-129628 | | 6/2008 |

OTHER PUBLICATIONS

Office Action issued Sep. 17, 2013 in corresponding Japanese Application No. 2009-094969.

* cited by examiner

*Primary Examiner* — George Bugg
*Assistant Examiner* — Anthony D Afrifa-Kyei
(74) *Attorney, Agent, or Firm* — Staas & Halsey LLP

(57) ABSTRACT

The event message is transmitted from an operative event detection device to the application, the transmission history is held by a device different from the operative event detection device, an event identifier of an event message and a time stamp in the generation history held by a standby event detection device is compared with an event identifier of an event message and a time stamp in the transmission history when the standby event detection device detects an abnormal condition of the operative event detection device, thereby transmitting an event message that has not been transmitted by the operative event detection device through the standby event detection device, and allowing the standby event detection device to transfer from the standby event detection device to an operative system.

6 Claims, 19 Drawing Sheets

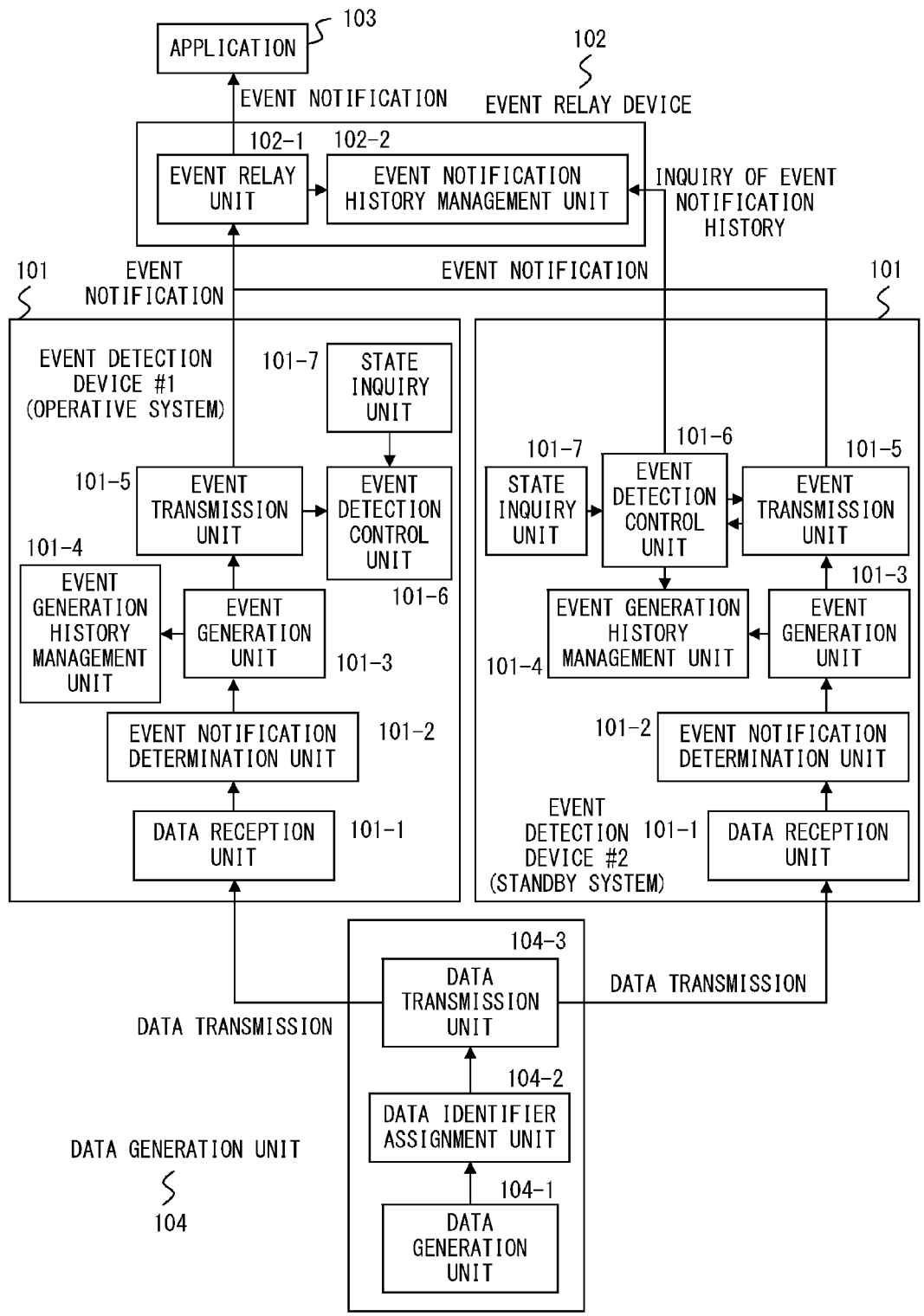
F I G. 1

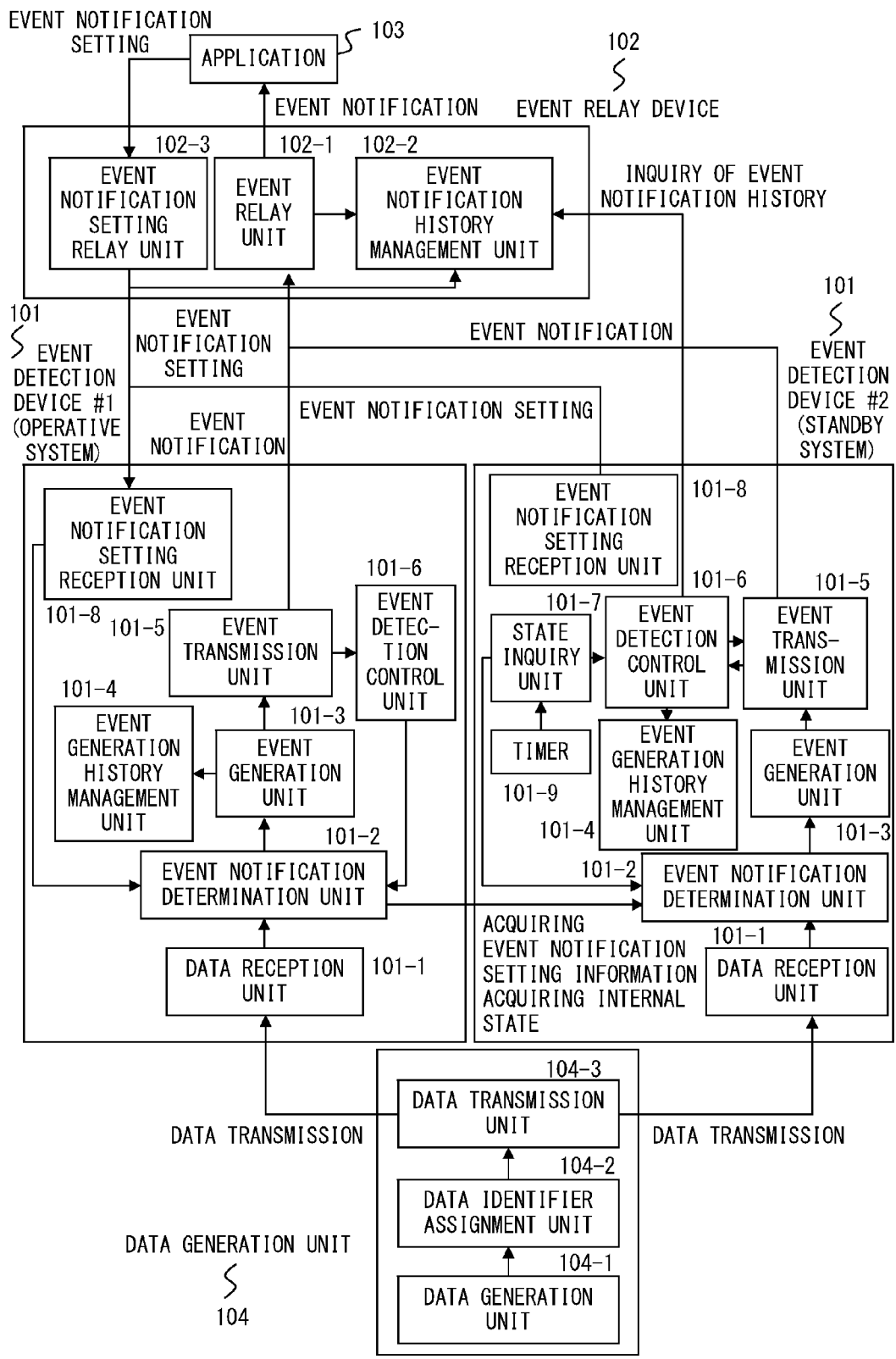
F I G. 3

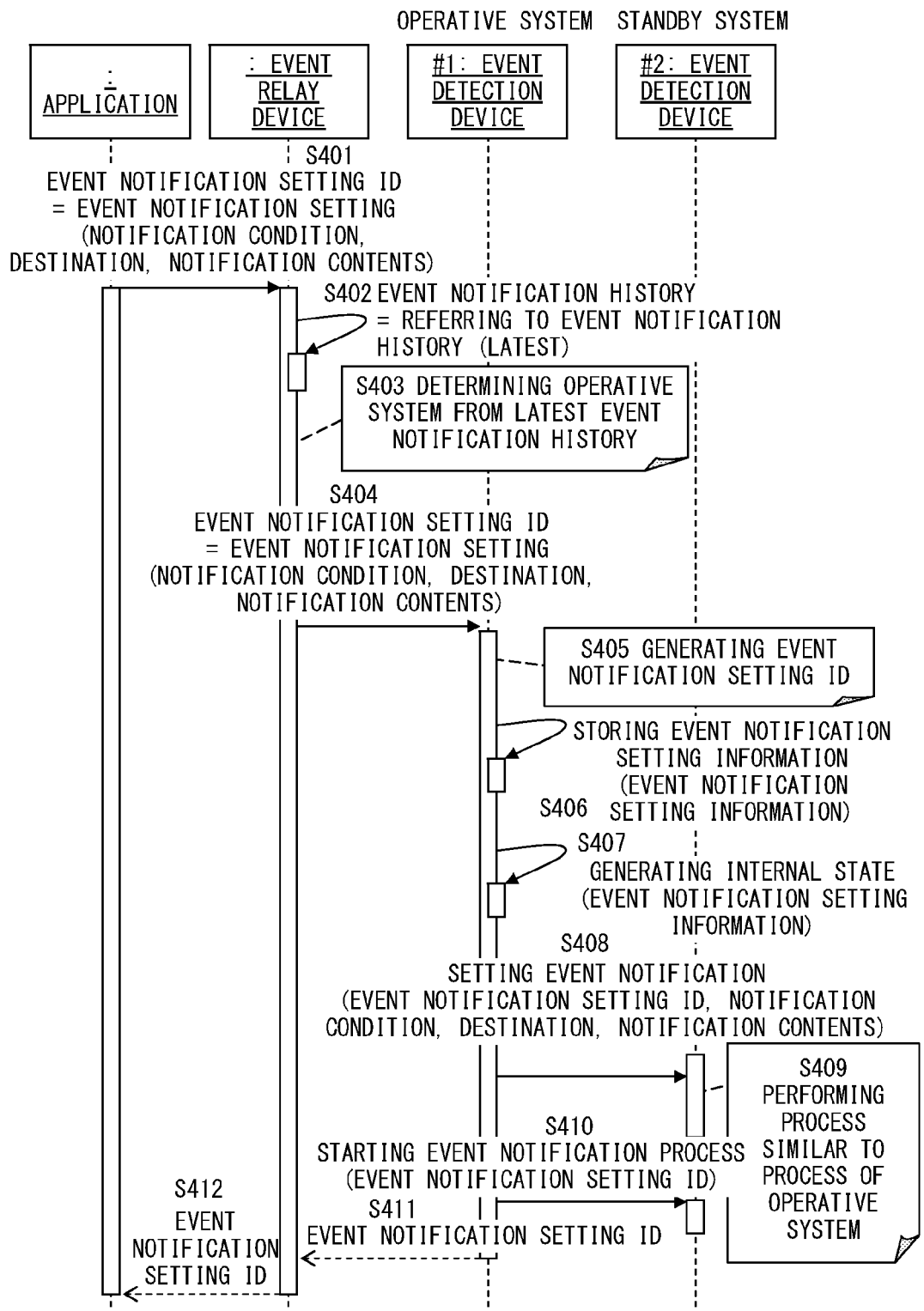
F I G. 4

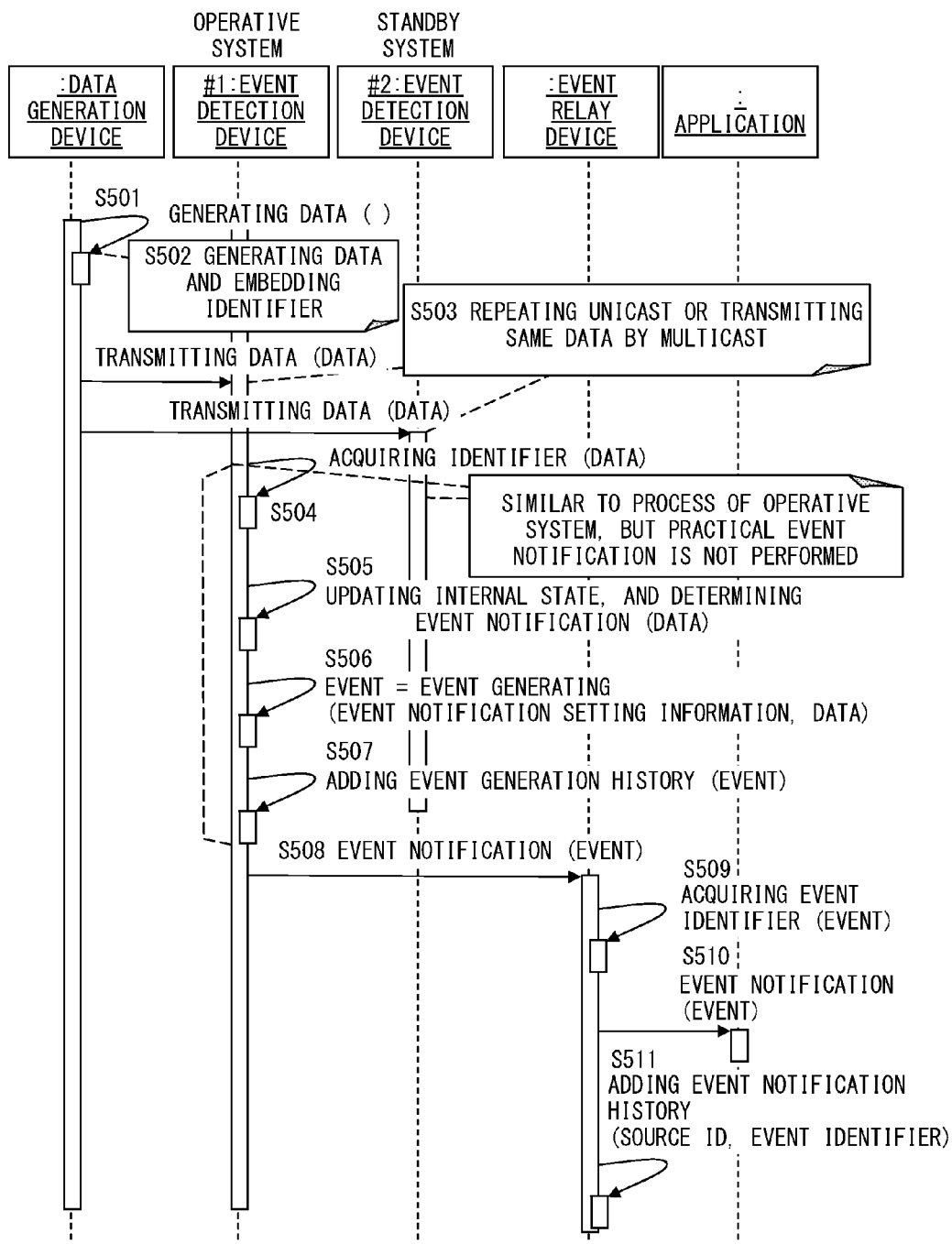
F I G. 5

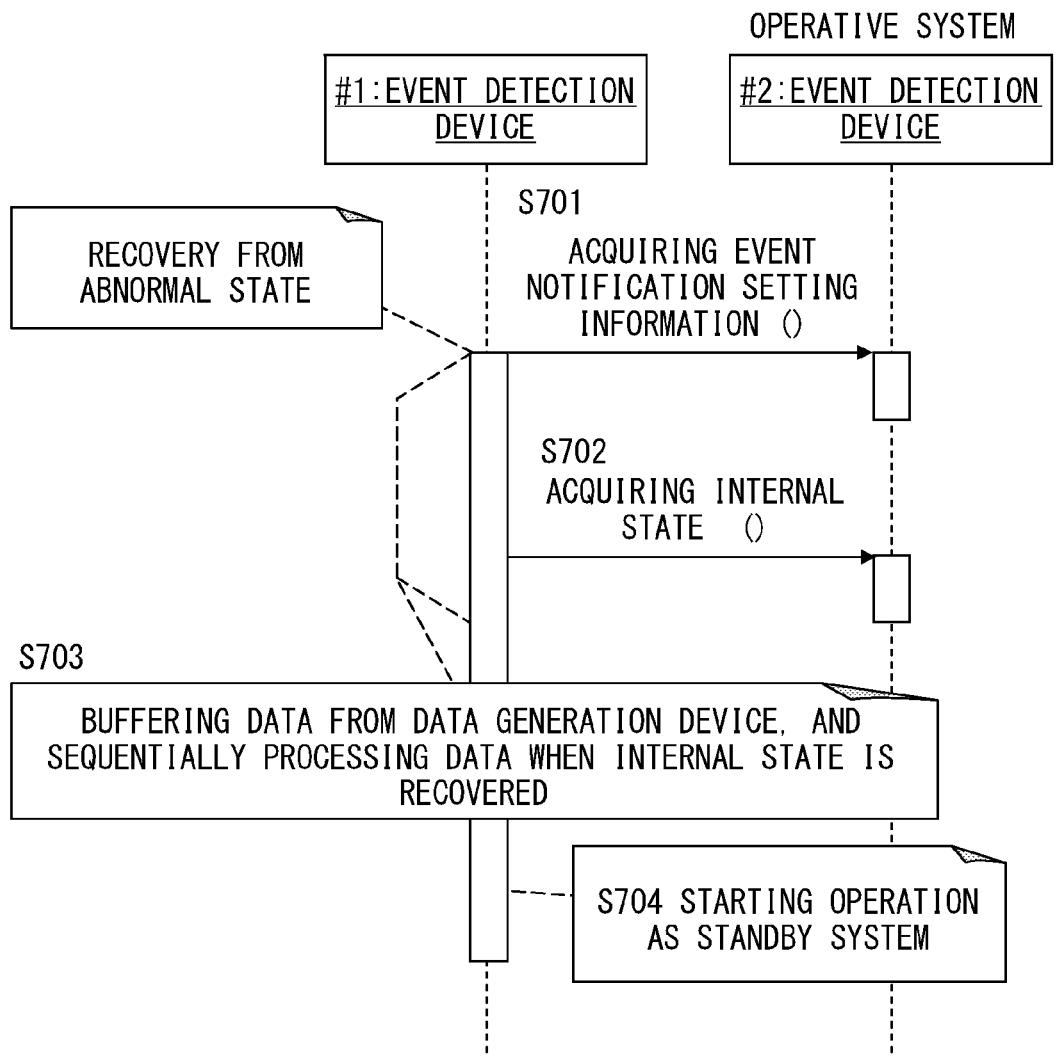
F I G. 7

| TIME STAMP | SOURCE IDENTIFIER | EVENT IDENTIFIER |
|---|---|---|
| 2008-11-6T08:58:51Z | EVENT DETECTION DEVICE #1 | [subid#02:sensor#1, data#4] |
| 2008-11-6T08:59:31Z | EVENT DETECTION DEVICE #1 | [subid#01:sensor#1, data#3] |

- TIME STAMP: DATE AND TIME WHEN EVENT MESSAGE IS RELAYED
- SOURCE IDENTIFIER: IDENTIFIER OF EVENT DETECTION DEVICE TO WHICH EVENT NOTIFICATION IS ISSUED
- EVENT IDENTIFIER: IDENTIFIER OF TRANSMITTED EVENT MESSAGE

F I G. 8

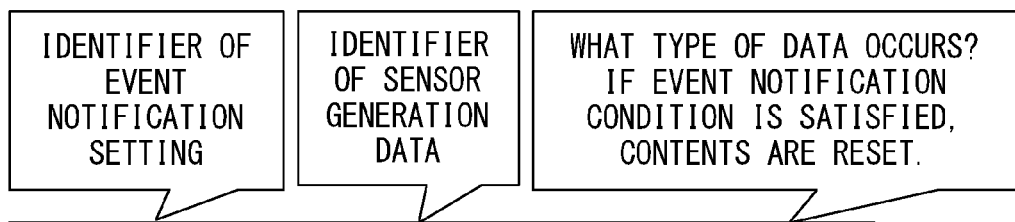
F I G. 1 0

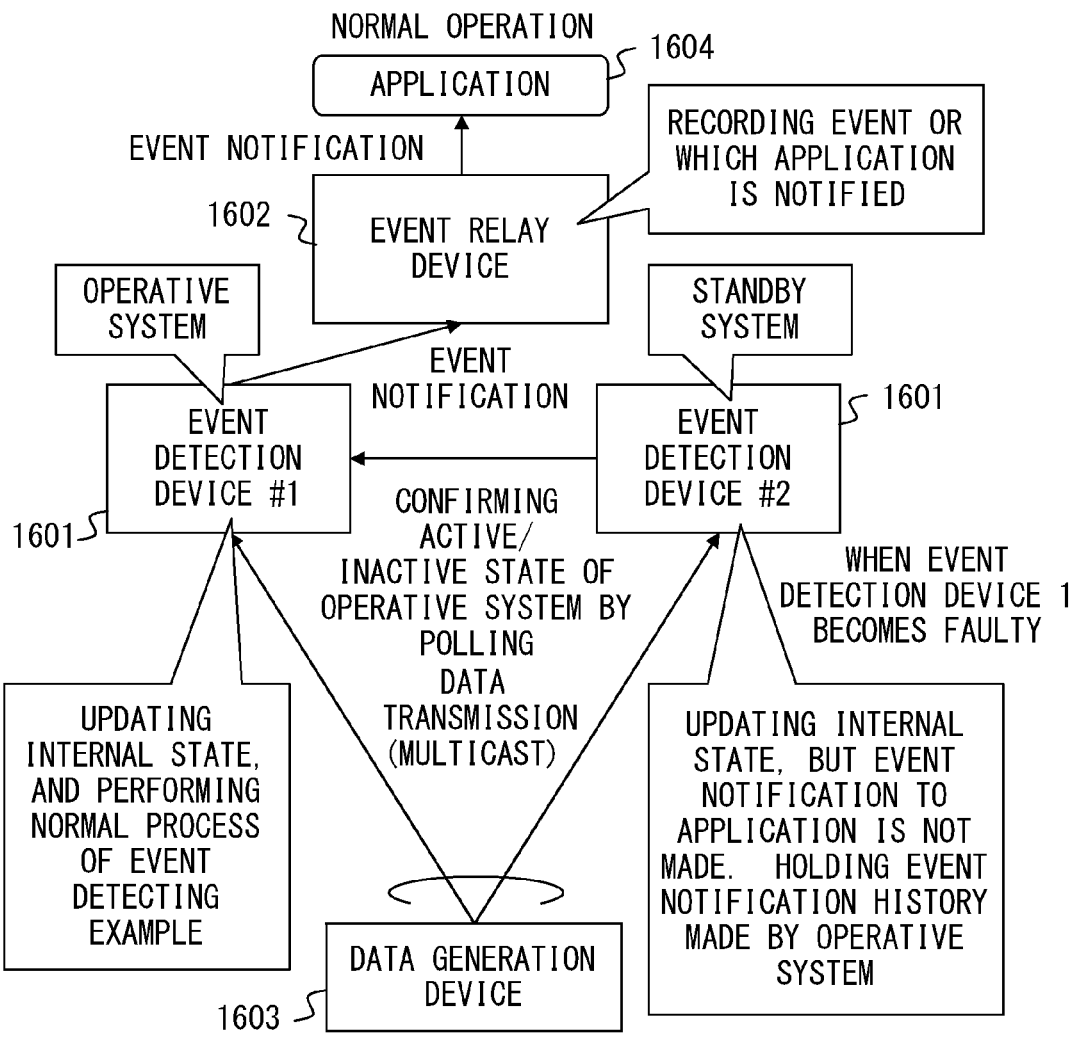
F I G. 1 6 A

EVENT DETECTION CONTROL METHOD AND SYSTEM

CROSS-REFERENCE TO RELATED APPLICATIONS

This application is based upon and claims the benefit of priority of the prior Japanese Patent Application No. 2009-094969, filed on Apr. 9, 2009, the entire contents of which are incorporated herein by reference.

FIELD

The technology to be disclosed relates to a technique of configuring a redundant event detection system.

BACKGROUND

It is requested that an application detects in real time from a large amount of data generated by a data generation device that data satisfies a certain condition, and a timely service can be realized. For example, there is a service devised so that a temperature sensor applied to a fruit provides temperature information at any time, a storage agent is immediately notified if a predetermined period in which a predetermined temperature continues for a predetermined time passes and the fruit becomes older and has lost its product value, thereby prompting an appropriate process to be performed. To attain this, the application uses an event detection device.

FIG. 14 is an example of the configuration of a common event detection device. An event detection device 1401 receives a setting of an event notification (event notification condition) from an application 1402, detects data matching the notification condition in a large amount of data generated by a data generation device 1403, and notifies the application of the information in real time as an event. In this case, the notification condition refers to a condition to be satisfied by the data generated by the data generation device 1403 when the application 1402 is notified that the data generation device 1403 has entered a predetermined state.

Normally, a service provider perform an application with a redundant configuration to improve the availability of a service. When a timely service is realized, it is disabled if an event notification is delayed. Therefore, it is necessary to configure a redundant event detection device so that an application can receive an event using another event detection device although a fault occurs in one event detection device. In addition, when one event detection device inherits an event detecting process of another event detection device, care is to be taken not to omit an event to be transmitted.

A generally well known redundant system uses a load balancer. FIG. 15 illustrates a configuration of a conventional technology of a redundant event detection system using a load balancer. With the configuration, a load balancer 1502 is arranged between a data generation device 1503 and two event detection devices 1501 (#1) and (#2) to monitor the active/inactive state of the event detection device 1501. Then, it normally transmits data to the event detection device 1501 #1, and an event detection device 1501 #1 issues a notification to an application ("APPLICATION" in FIG. 15) 1504. When an abnormal condition occurs in the event detection device 1501 #1, data is transmitted to the event detection device 1501 #2, and the event detection device 1501 #2 issues a notification to the application 1504, and the event detecting process is continued.

The event detection device 1501 has an internal state for comparison between received data and the notification condition to speedup the detecting and notifying process. The internal state refers to a transition state of data from the data generation device 1503 managed by the event detection device 1501 for each notification condition. In this case, the redundant system as illustrated in FIG. 15 cannot be applied. For example, when an event is notified if the condition of continuing the temperature of or above 20° C. for two or more minutes is satisfied, it is necessary to hold the state for the past two minutes as an internal state. However, although an abnormal condition occurs in the event detection device 1501 #1 and the event detection device 1501 #2 is to inherit the event detecting process, a different internal state prevents a correct notification determination as is.

When the detecting and notifying process is inherited, a method of copying an internal state can be used. However, during the process of copying the internal state, data is continuously generated, and the internal state does not stay in the same condition after the copying process is completed. In addition, when an abnormal condition occurs in the event detection device, the internal state is not necessarily copied.

To solve the problem above, the event detection system illustrated in FIGS. 16A and 16B is considered. A data generation device 1603 transmits the same data to two event detection devices, and maintain the internal state of the two event detection devices 1601 (#1) and (#2) constantly in the same conditions. Data transmission means can be multicast or repetitive unicast. Practically, a notification of an event is transmitted to an application (described as "APPLICATION" in FIGS. 16A and 16B) 1604 by only an event detection device 1601 in the operative state. For example, in the example in FIG. 16A, the event detection device 1601 #1 is in the operative state, that is, acts as an operative system. The event detection device 1601 in the standby state internally performs the event generating process, holds the history, but does not issues a notification to the application 1604. In the example in FIG. 16A, the event detection device 1601 #2 is in the standby state, that is acts as a standby system. Normally, the operative event detection device 1601 notifies the application 1604 of an event through the event relay device 1602, and the event relay device 1602 keeps the history of the events notified to the application 1604. On the other hand, the standby event detection device 1601 periodically confirms whether or not the operative event detection device 1601 is operating. As illustrated in FIG. 16B, when the standby event detection device 1601 detects an abnormal condition, the device inquires of the event relay device 1602 about the history, and compares it with the event generation history accumulated in the standby event detection device 1601. The standby event detection device 1601 designates an event generated as an event but not actually notified to the application 1604, notifies an application of the event, enters in the operative system, and starts a normal event notifying process. Thus, when the event notifying process transfers from an operative system to a standby system, an event notification is made from the point where an abnormal condition occurs in the operative system, thereby preventing the omission of an event notification.

In this case, the important point is an event notifying method. Normally considered can be a method of using as an identifier the order of data input to the event detection device, and a method of using as an identifier the order of generating events. However, there are the following problems with the event notification.

When the order of input data is used as an identifier:
A plurality of events can occur with respect to one piece of input data, and an event cannot be identified using the order of the input data.

For example, in FIG. 17A, assume that under the same notification condition of "keeping the temperature of 20° C. or more for one minute or longer" for applications (described as "APPLICATION" in FIGS. 17A and 17B) 1703 (#1) and (#2), an event notification is set in each of the applications. Also assume that the data of 17° C. at 12:00 and 21° C. at 12:01 are received as the internal state of an event detection device 1701. Then, if the event detection device 1701 receives the data of 20° C. at 12:02, the notification conditions of the applications 1703 #1 and #2 are satisfied. Therefore, the same event is notified to both of the applications. Accordingly, an event cannot be identified only by identifying the order of the input data to the event detection device 1701, and it cannot be determined which event notification has failed when an abnormal condition occurs.

When the order of generating an event is used:

Since the event notifying process is performed by multithreading, an event notification message is not always generated in the same order in a plurality of event detection devices.

For example, in FIG. 17B, assume that an application 1706 #3 sets an event notification under the notification condition of "keeping the temperature of 20° C. or more for one minute or longer". Also assume that the same data are received from event detection devices 1704 (#1) and (#2) and a data generation device 1705, and the internal states are 17° C. at 12:00 and 21° C. at 12:01 for a sensor #1, and 18° C. at 12:00 and 20° C. at 12:01 for a sensor #2. When the data of 20° C. for the sensor #1 and 21° C. for the sensor #2 as the information at 12:02 are transmitted to an event detection device 1704 at the substantially same time, abnormal temperature events about the sensors #1 and #2 are generated in both of the event detection devices 1704. In this case, since the data of the sensors #1 and #2 are processed in parallel, which sensor first completes generating an event depends on the state of the event detection device 1704. Therefore, an event cannot be identified by the order of generating events.

There is a prior art of a storage system provided with a duplex volume and a replicate volume in identifying an event, in which when a replicating process is interrupted by a fault of a primary master volume, a secondary master volume immediately inherits the replicating process. The prior art solves the problem that since the primary and secondary master volumes are independent of each other, the secondary system cannot know in which process the primary system has been interrupted, thereby failing in correctly inheriting the interrupted replication of data. Therefore, a server transmits the same write data to both of the primary system and the secondary system. The primary system and the secondary system assign a number to a write request from the server, update the contents of their own logical disks, and hold the update histories. Only the primary system performs the replicating process on the replicate volume, and allows the replicate volume to store the number of completed process. When a fault occurs in the primary system, and the secondary system inherits the process, the replicate volume is inquired about the number of the completed process, and the replicating process is resumed immediately after the last completed process. In this method, since the same data is transmitted to both master volumes, they can maintain the same internal state, and an incomplete replicating process can be performed by comparing the history of the replicate volume with the histories of the master volumes when the process is inherited.

In this prior art, a write request to the storage is input and a write request to the replicate volume is output, the input corresponds one-to-one to the output, and the order of the output is supposed to match the order of the input. Therefore, by assigning a number when a write request is received, a write request to the replicate volume can be identified.

However, when the above-mentioned event notification is made, the data from the data generation device does not necessarily correspond one-to-one to the data to the application. Therefore, the above-mentioned prior art cannot be applied.

Japanese Laid-open Patent Publication No. 2006-285336 and Japanese Laid-open Patent Publication No. 2001-045021 are disclosed as a prior art relating to the technology disclosed by the present application.

SUMMARY

The technology to be disclosed is realized as an event detection control method or system. For example, when the technology is realized as a method, the following configuration is adopted.

A comparing step compares the generated data from the data generation device with the event notification setting information preset by the application and including the notification condition and the notification contents.

A notifying step notifies the application of the event message indicating the notification contents when the generated data satisfies the notification condition by a redundant configuration of a plurality of event detection devices including an operative system and a standby system.

A data identifier assigning step assigns to generated data a data identifier for identification of the order of generating the generated data in the data generation device.

An event message generation control step redundantly performs using each event detection device an operation of determining whether or not generated data satisfies the notification condition of the event notification setting information corresponding to the internal state for each internal state determined by the combination of event notification setting information and the generated data, generating an event message including an event identifier uniquely determined from the internal state and the data identifier of the generated data when the condition is satisfied, and holding a generation history.

An event message transmission control step transmits an event message from an operative event detection device to an application, and holds a transmission history by a device different from the operative event detection device.

An abnormal condition control step compares an event identifier of an event message and a time stamp in the generation history held by a standby event detection device with an event identifier of an event message and a time stamp in the transmission history when the standby event detection device detects an abnormal condition of the operative event detection device, thereby transmitting an event message that has not been transmitted by the operative event detection device through the standby event detection device, and allowing the standby event detection device to transfer from the standby event detection device to an operative system.

The object and advantages of the invention will be realized and attained by means of the elements and combinations particularly pointed out in the claims.

It is to be understood hat both the foregoing general description and the following detailed description are exemplary and explanatory and are not restrictive of the invention, as claimed.

BRIEF DESCRIPTION OF DRAWINGS

FIG. 1 is a configuration according to the first embodiment of the event detection system;

FIG. 3 is a configuration according to the second embodiment of the event detection system;

FIG. 4 is an operation sequence of the event notification setting process;

FIG. 5 is an operation sequence of the event detecting and notifying process;

FIG. 7 is an operation sequence of the recovery process;

FIG. 8 is an example of a data configuration of the event notification history information management table;

FIG. 10 is an example of an internal state management table;

FIG. 16A is a configuration of another conventional event detection system when the event detection device #1 is in the operative state and the event detection device #2 is in the standby state.

DESCRIPTION OF EMBODIMENTS

Figure 2:
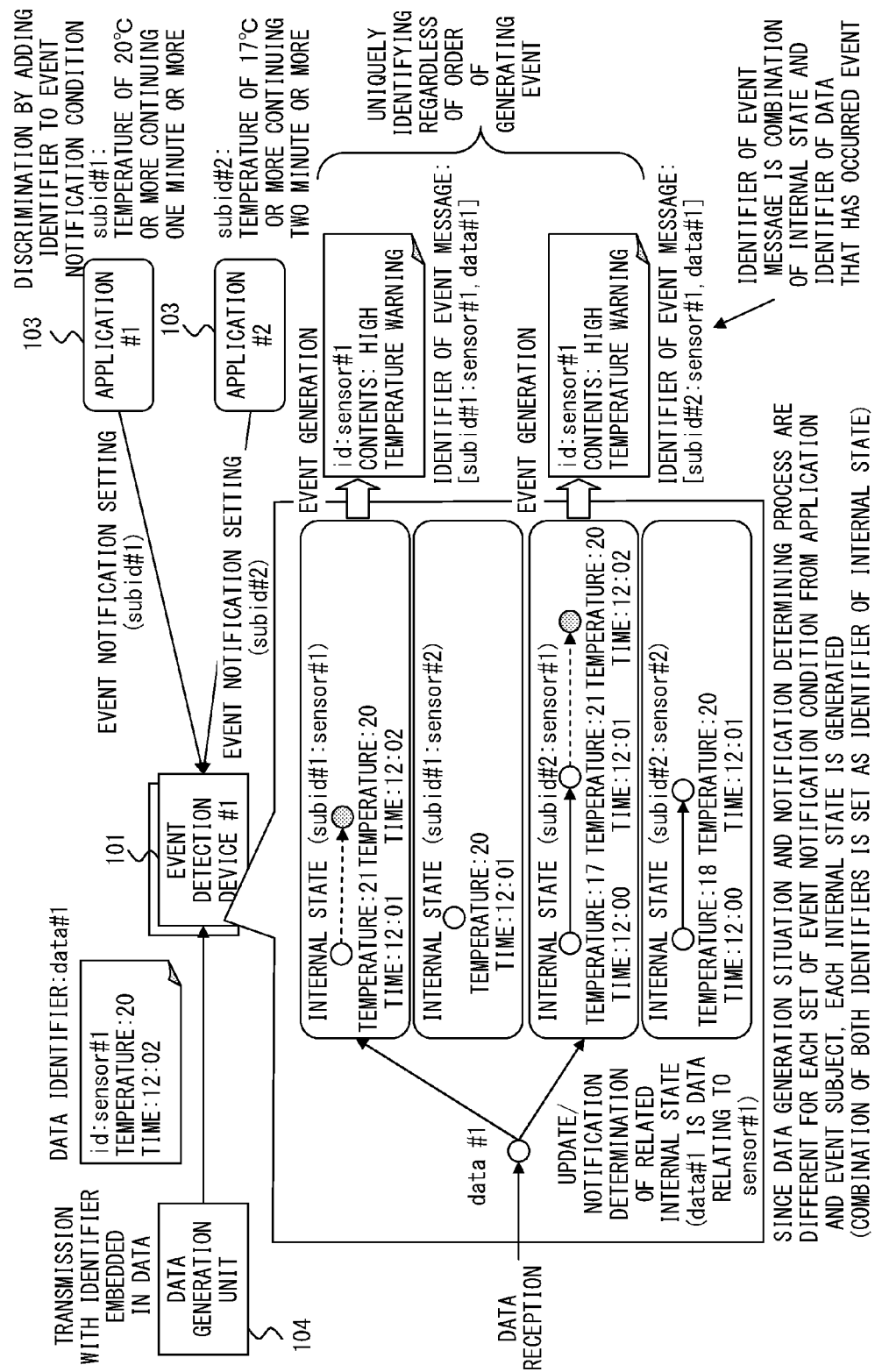
FIG. 2 is an explanatory view of an event detecting operation according to the first embodiment.

The embodiments of the present invention are described below in detail.

FIG. 1 is a configuration according to the first embodiment of the event detection system.

In a data generation unit 104 illustrated in FIG. 1, a data generation unit 104-1 generates data to be transmitted to an event detection device 101

A data identifier assignment unit 104-2 generates an identifier by which the data generated by the data generation unit 104-1 can be uniquely identified, and embeds it in data.

The data transmission unit 104-3 transmits data with the identifiers of two event detection devices (#1) and (#2).

In the event detection device 101 in FIG. 1, a data reception unit 101-1 receives the data transmitted by the data generation unit 104, and acquires an identifier of the data.

A event notification determination unit 101-2 manages the internal state for an event notification determination, and compares the contents of the data with the event notification condition set by the application.

An event generation unit 101-3 generates the identifier of an event from the identifier of the internal state and the identifier of the data that has generated the event, and generates an event message in which the identifier of the event is embedded.

An event generation history management unit 101-4 manages the history of the event generated by the event generation unit 101-3.

An event transmission unit 101-5 transmits the event message generated by the event generation unit 101-3 to a application (described as "application" in FIG. 1) 103 through an event relay device 102.

An event detection control unit 101-6 manages the operation mode (an operative system or a standby system) of the event detection device 101, and compares the event notification history when an abnormal condition of an operative system is detected during the operation of a standby system, thereby issuing an instruction to transmit a notification of an omitted event.

A state inquiry unit 101-7 confirms the operative active/inactive state when the event detection device 101 operates as a standby system.

In the event relay device 102 illustrated in FIG. 1, the event relay unit 102-1 receives an event notification from the event detection device 101, extracts an identifier from the event message, and relays the event message to the application 103. The event notification history management unit 102-2 stores the history of the event relayed by the event relay device 102 together with the identifier.

In the configuration of the first embodiment above, the relationships between the arrangement of the component of the event detection device 101 and the components are different between the operative system and the standby system, but they are different for convenience in describing the operations, and the practical components are the same.

In the configuration of the first embodiment above, the operation by the data identifier assignment unit 104-2 corresponds to an embodiment of the data identifier assigning step or the data identifier assignment unit within the scope of the claims of the present invention. In addition, the operations by the event notification determination unit 101-2, the event generation unit 101-3, and the event generation history management unit 101-4 correspond to an embodiment of the event message generation control step or the event message generation control unit within the scope of the claims of the present invention. The operations of the event transmission unit 101-5, the event relay unit 102-1, and the event notification history management unit 102-2 correspond to an embodiment of the event message transmission control step or the event message transmission control unit within the scope of the claims of the present invention. The operations by the event detection control unit 101-6 and the state inquiry unit 101-7 correspond to an embodiment of the abnormal condition control step or the abnormal condition control unit, and the recovery step or the recovery unit within the scope of the claims of the present invention.

The normal operation according to the first embodiment with the above-mentioned configuration is described below.

The data generation unit 104-1 of the data generation unit 104 generates transmission data at any time and passes the data to the data identifier assignment unit 104-2. The data identifier assignment unit 104-2 generates an identifier assigns it to the transmission data, and transmits the data to the event detection device 101 #1 as an operative system and the event detection device 101 #2 as a standby system through the data transmission unit 104-3.

In both event detection devices (#1) and (#2) as the operative system and the standby system, the data reception unit 101-1 receives the data from the data generation unit 104, extracts the identifier of the data, and passes the received data to the event notification determination unit 101-2.

The event notification determination unit 101-2 updates the internal state depending on the received data, and compares it with the notification condition specified by the application. When the comparison is successfully performed, the event notification determination unit 101-2 instructs the event generation unit 101-3 to generate an event and notifies the application of the event.

The event generation unit 101-3 generates the identifier of the event from the identifiers of the internal state and the received data, generates an event message including the identifier, and registers the history including the identifier and the event message in the event generation history management unit 101-4.

As illustrated in FIG. 2, the identifier of the event message is expressed by the combination of the identifier of the internal state used for event notification determination and the identifier of the data as the trigger of the generation of the event. The internal state is generated for each combination of an event notification setting from the application 103 and the identifier applied to what is the subject of the event (for example, a sensor) because, since the generation status of the data and the notification determining process are different for each set of the event notification condition and the subject of the event, the state transitions are different. Since each event message is generated from the internal state, events generated from different internal states can be discriminated by the identifiers of the internal states. The event generated by one internal state can be discriminated by the identifier of the data as a trigger of the event regardless of the generation order. Therefore, by the combination of the identifier of the internal state and the identifier of the data as the trigger of the generation of an event, the event can be completely identified.

Afterwards, the event generation unit 101-3 instructs the event transmission unit 101-5 to transmit the provided event to the application 103 through the event relay device 102.

The event detection control unit 101-6 manages whether the own event detection device is operating as an operative system or a standby system. The event transmission unit 101-5 that has received an instruction to transmit the event inquires of the event detection control unit 101-6 about the operation mode before transmitting the event. If the result of the inquiry refers to an operative system, it notifies the application 103 of the event practically through the event relay device 102. If it refers to a standby system, the unit does not notify the application 103 of the event, thereby terminating the process.

The event relay unit 102-1 of the event relay device 102 that has received the event from the operative event detection device 101 acquires the identifier of the event, and registers the identifier as a history in the event notification history management unit 102-2.

On the other hand, the state inquiry unit 101-7 of the standby event detection device 101 (#2 in the example illustrated in FIG. 1) periodically confirms the active/inactive state of the operative event detection device 101 (#1 in the example illustrated in FIG. 1). Then, the state inquiry unit 101-7 of the standby event detection device 101 notifies the event detection control unit 101-6 of an abnormal condition of the operative system when the operative event detection device 101 is not normally operating.

Upon receipt of the notification, the standby event detection control unit 101-6 acquires the event notification history from the event notification history management unit 102-2 of the event relay device 102, and compares the history with the event notification history managed by the event generation history management unit 101-4 of the own event detection device. In this case, the event detection control unit 101-6 determines the identity of them by the identifier of the event message, and a notification is determined according to the event notification history in the own event detection device, but checks the event notification not in the history of the event relay device 102.

The event detection control unit 101-6 sequentially transmits the checked event notifications to the event relay device 102 through the event transmission unit 101-5. Then, the event detection control unit 101-6 changes the operation mode to the operative system, and operates the own event detection device as an operative system.

As described above, in the first embodiment, the data identifier assignment unit 104-2 includes the identifier in the data transmitted by the data generation unit 104. Then, the event generation unit 101-3 in the event detection device 101 uses the identifier of the data when an event is generated, thereby generating an identifier for complete discrimination of an event.

The event generation history management unit 101-4 of the event detection device 101 generates an event generation history, and the event notification history management unit 102-2 of the event relay device 102 records the history of the event actually notified to the application. Then, when the standby system detects an abnormal condition of the operative system, the histories are compared with each other, thereby transmitting the omitted events by the operative system from the time point where the abnormal condition has practically occurred in the operative system.

Therefore, in the first embodiment, omitted event notifications do not occur, thereby successfully improving the availability and the reliability of event notification.

FIG. 3 is a configuration according to the second embodiment of the event detection system. In FIG. 3, the same portion as the processing unit also illustrated in FIG. 1 according to the first embodiment is as signed the same reference numeral.

In the configuration in FIG. 3, in addition to the configuration illustrated in FIG. 1, an event notification setting relay unit 102-3 is provided in the event relay device 102. In addition, an event notification setting reception unit 101-8 and a timer 101-9 are provided in each of the event detection devices 101 #1 and #2.

The normal operation according to the second embodiment with the configuration illustrated in FIG. 3 includes the following four processes.

(1) Event notification setting process by application (2) Event detecting and notifying process by operative and standby event detection devices 101

(3) Process of detecting an abnormal condition and transferring to an operative system by standby event detection device 101

(4) Recovery process of event detection device 101 in which abnormal condition occurs (1) Event notification setting process by application is described below.

The operation of the event notification setting process by the application 103 is described below with reference to the operation sequence illustrated in FIG. 4.

The event notification setting relay unit 102-3 of the event relay device 102 receives an event notification setting request from the application 103 (step S401). The event notification setting relay unit 102-3 refers to the event notification history management unit 102-2 (step S402), determines the event detection device 101 currently operating as an operative system (step S403), and transmits the event notification setting request thereto (step S404). The event notification history management unit 102-2 manages the event notification history information management table as illustrated in FIG. 8. That is, each entry of the table is configured by a set of information including a time stamp indicating the date and time when the event message is relayed, the source identifier as an identifier of the event detection device 101 that has issued a notification of an event, and an event identifier as an identified of the transmitted event message. The event notification setting relay unit 102-3 refers to the time stamp and the source identifier of each entry of the table in the event notification history management unit 102-2, and determines one of the event detection devices 101 #1 and #2 whichever has lately issued an event notification as the current operative system. Then, the event notification setting relay unit 102-3 transmits the event notification setting request to the event detection device 101 determined as the operative system.

The event notification setting reception unit 101-8 of the operative event detection device 101 notifies the event notification determination unit 101-2 of the received event notification setting request (step S404).

Figure 9:
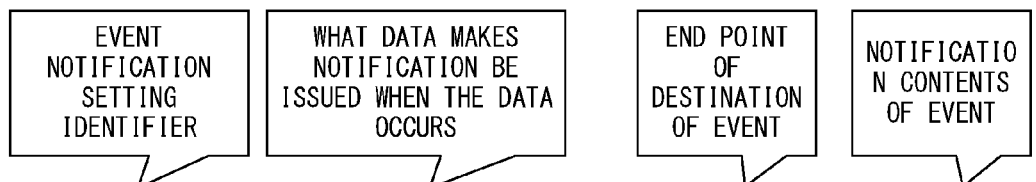
FIG. 9 is an example of a data configuration of the event notification setting information management table.

The event notification determination unit 101-2 confirms the contents of the event notification setting request, generates a notification setting ID as an identifier (step S405), and then generates the entry of the event notification setting information management table, that is, the event notification setting information (step S406). FIG. 9 is an example of a data configuration of the event notification setting information management table held by the event notification determination unit 101-2. As illustrated in FIG. 9, each entry of the table holds the event notification setting information including a notification setting ID, a notification condition, a destination application, and notification contents. The notification condition indicates what data makes a notification be issued. The notification contents refer to a warning value displayed for the destination application 103.

In addition, the event notification determination unit 101-2 generates an entry of the internal state management table for detection of an event together with the entry of the event notification setting information management table (step S407). FIG. 10 is an example of a data configuration of an internal state management table for holding the internal state managed by the event notification determination unit 101-2. Each entry of the table, that is, the internal state is generated in a set unit for each combination of an event notification setting (notification setting ID above) and a subject that generates an event (event subject). A combination of the notification setting ID and the event subject is an internal state identifier. Each entry also holds the data generation state. The data generation state is an internal state indicating what data is being generated. The internal state of the data generation state is reset when the notification condition of the entry of the event notification setting information management table corresponding to the notification setting ID is satisfied and the destination application 103 set in the entry is notified of the internal state.

The operative event notification determination unit 101-2 notifies the standby event notification determination unit 101-2 of the event notification setting information generated in step S406 (step S408). As a result, a similar process is performed on the standby system side (step S409), the event notification setting information is set in the event notification setting information management table, and the internal state is set in the internal state management table, thereby performing the preparation for detection and notification of an event.

Afterwards, the operative event notification determination unit 101-2 starts the event detecting and notifying process in the own event detection device, a start instruction is transmitted to the standby event notification determination unit 101-2, thereby starting the event detecting and notifying process (step S410).

Finally, the operative event notification determination unit 101-2 returns the notification setting ID to the application 103 through the event notification setting reception unit 101-8 and the event notification setting relay unit 102-3 of the event relay device 102 (steps S411 and S412).

By the above-mentioned event notification setting process, the event detecting and notifying process set by the application 103 is prepared in each event detection device 101.

(2) Event detecting and notifying process by operative and standby event detection devices 101 is described below.

The operation of the event detecting and notifying process by the operative and standby event detection devices 101 is described below with reference to the operation sequence in FIG. 5.

The data generation unit 104-1 of the data generation unit 104 generates the transmission data (generated data) and passes the data to the data identifier assignment unit 104-2 (step S501).

The data identifier assignment unit 104-2 generates a data identifier by combination of the host name of the data generation unit 104 and the time, embeds the data identifier in the generated data, and passes the resultant data to the data transmission unit 104-3 (step S502).

The data transmission unit 104-3 transmits the generated data to the two event detection devices 101 #1 and #2 (step S503). The transmitting method may be repeating the unicast or using an existing multicast network.

The data reception units 101-1 of the operative and standby event detection devices 101 receive generated data, extract the data identifier embedded in the generated data, and pass the data identifier to the event notification determination unit 101-2 (step S504).

The event notification determination unit 101-2 updates the internal state relating to the generated data, and compares the updated data with the notification condition of the event notification setting information (step S505). To be more concrete, the event notification determination unit 101-2 retrieves the item "event subject" corresponding to the source data generation unit 104 recognized in step S504 in the internal state management table exemplified in FIG. 10. Then, the event notification determination unit 101-2 adds the generated data (including the data identifier) notified by the data reception unit 101-1 to the item "data generation state" of the corresponding one or more entries. Next, the event notification determination unit 101-2 searches the event notification setting information management table exemplified in FIG. 9 by the value of the item "notification setting ID" of the entry, and compares the "notification condition" of the corresponding entry with the generated data. If there is event notification setting information satisfying the notification condition as a result of the comparison, the event notification determination unit 101-2 passes the comparison information to the event generation unit 101-3. The comparison information includes the notification setting ID, the event subject, the destination application, the notification contents, and the generated data (including the data identifier). The notification setting ID and the event subject can be acquired from the entry of the internal state management table exemplified in FIG. 10 to which the generated data is added. The destination application and the notification contents can be acquired from the entry of the event notification setting information management table hit in the comparison above. The generated data (including the data identifier) is notified by the data reception unit 101-1.

The event generation unit 101-3 generates an event identifier from the internal state identifier having a notification setting ID and an event subject and a data identifier in the generated data. Then, the event generation unit 101-3 generates an event message having the event identifier, the notification contents, and generated data (step S506).

Figure 11:
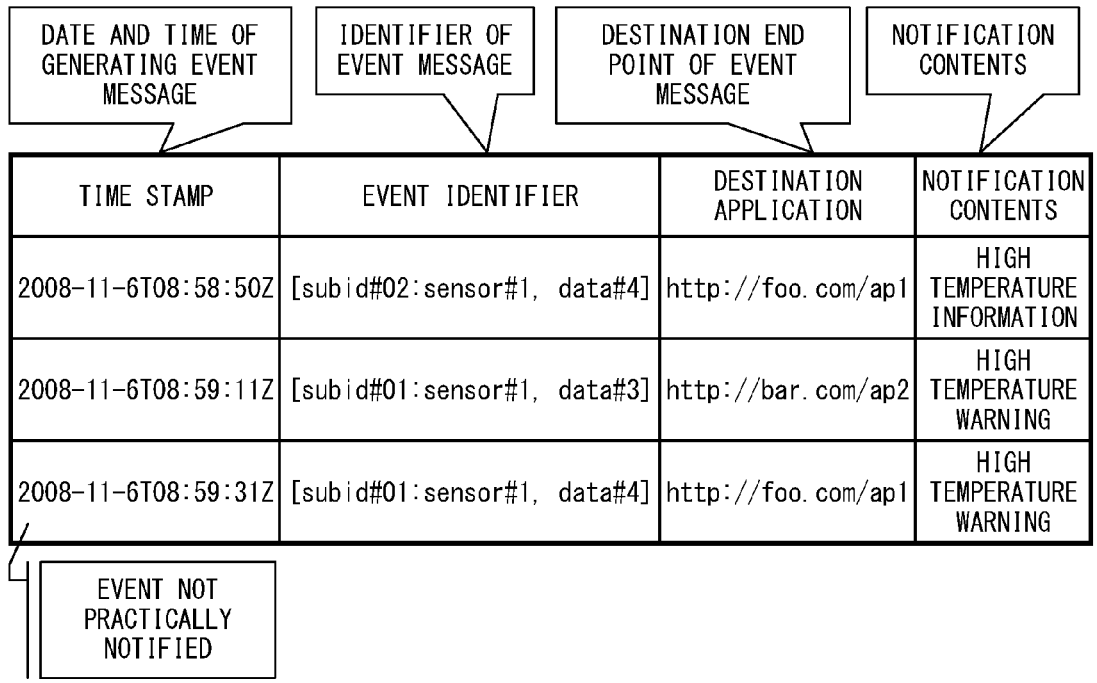
FIG. 11 is an example of an event generation history information management table.

The event generation unit 101-3 transmits the event message to the event generation history management unit 101-4 (step S507). The event generation history management unit 101-4 adds the event message to the event generation history information management table having the data configuration example illustrated in FIG. 11. The entries of the table are a set of information including a time stamp, an event identifier, a destination application, and notification contents. The time stamp indicates the date and time of the time point of registration. The event identifier is the information included in the event message. The destination application is the information transmitted from the event notification determination unit 101-2 to the event generation unit 101-3. The notification contents are information included in the event message.

Then, the event generation unit 101-3 instructs the event transmission unit 101-5 to notify the destination application transmitted from the event notification determination unit 101-2 of the event message. The event transmission unit 101-5 inquires of the event detection control unit 101-6 about the operation mode (operative system or standby system) of itself. If the operation mode refers to a standby system, the event transmission unit 101-5 terminates the process as is. If the operation mode refers to an operative system, the event transmission unit 101-5 instructs the event relay unit 102-1 of the event relay device 102 to issue a notification of an event (step S508).

The event relay unit 102-1 retrieves an event identifier from the received event message (step S509). Then, the event relay unit 102-1 notifies the destination application 103 of the received event message (step S510). The event relay unit 102-1 registers a time stamp, a source identifier, and an event identifier as a history in the event notification history information management table illustrated in FIG. 8 in the event notification history management unit 102-2 (step S511). The time stamp indicates the date and time of the registration. The source identifier refers to the identifier of the event detection device 101 that has transmitted the event message.

(3) Process of detecting an abnormal condition and transferring to an operative system by standby event detection device 101 is described below.

Figure 6:
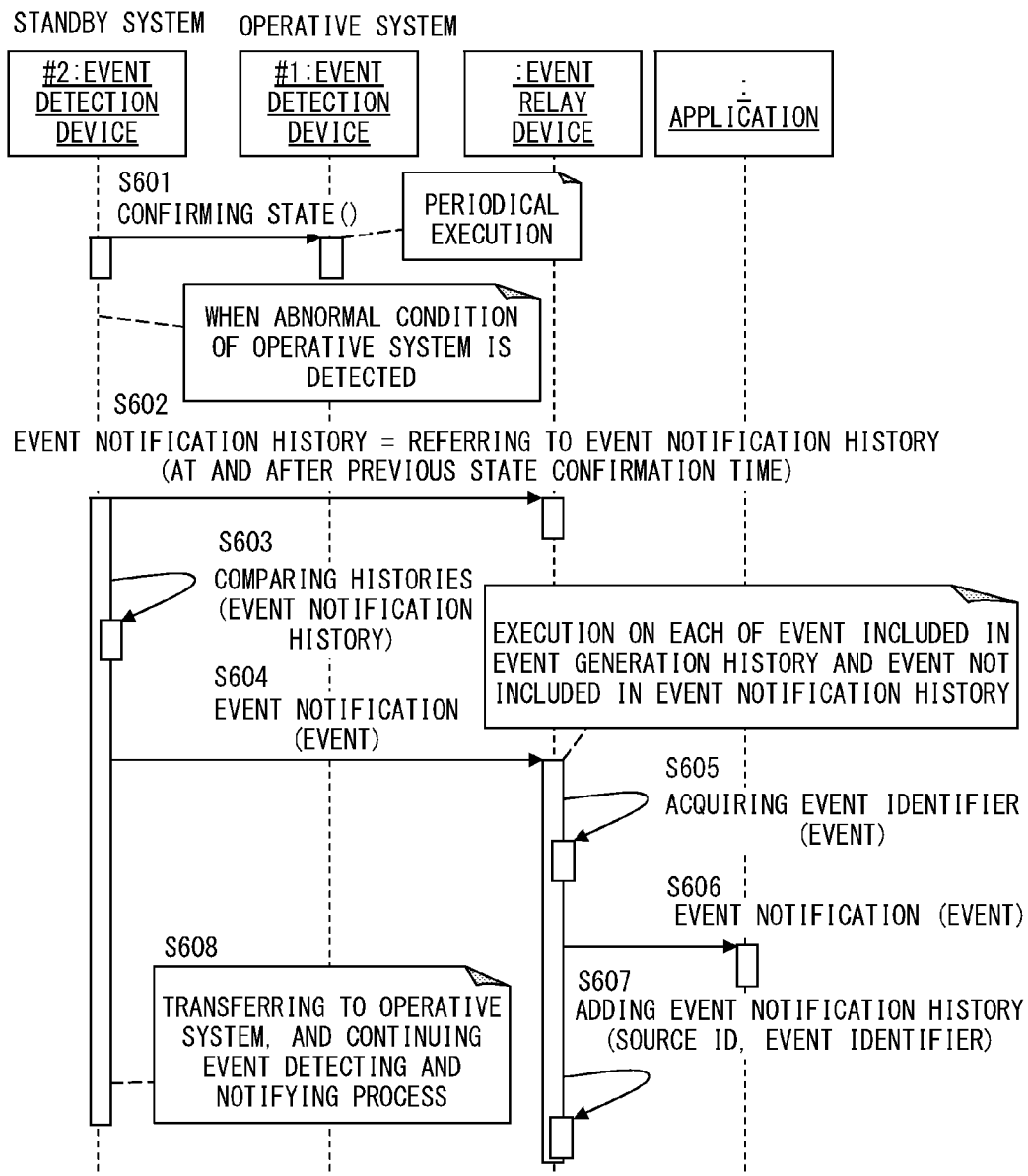
FIG. 6 is an operation sequence of the process of detecting an abnormal condition and transferring to an operative system.

The operation of the process of detecting an abnormal condition and transferring to an operative system by the standby event detection device 101 is described below with reference to the operation sequence in FIG. 6.

The timer 101-9 of the standby event detection device 101 instructs the state inquiry unit 101-7 at predetermined time intervals to inquire about the operation state of the operative event detection device 101 (step S601).

The state inquiry unit 101-7 stores the previous inquiry time. If it detects an abnormal condition of the operative system (no response or negative response from the operative system), it instructs the event detection control unit 101-6 to perform an inheriting process with the previous inquiry time added to the instruction. The event detection control unit 101-6 acquires the event notification history having the time stamp of or subsequent to the previous inquiry time from the event notification history information management table (in FIG. 8) in the event notification history management unit 102-2 of the event relay device 102 (step S602).

The event detection control unit 101-6 compares the event notification history acquired from the event relay device 102 with the event generation history registered in the event generation history information management table in the event generation history management unit 101-4 of the own event detection device (step S603). Then, the event detection control unit 101-6 acquires the event notification information not included in the event notification history but included in the event generation history at or after the previous inquiry time. The event detection control unit 101-6 then instruct the event transmission unit 101-5 to issue a notification of the event message corresponding to each piece of the acquired event notification information. As a result, as in the series of processes from step S508 to step S511, the event notification from the standby event detection device 101 is performed (from step S604 to step S607).

Then, the event detection control unit 101-6 of the standby event detection device 101 changes the operation mode to an operative system, and operates the own event detection device as an operative system.

(4) Recovery process of event detection device 101 in which abnormal condition occurs is described below.

The operation of the recovery process of the event detection device in which abnormal condition occurs is described below with reference to the operation sequence illustrated in FIG. 7.

When the event detection device 101 in which abnormal condition occurs is reactivated, the event detection control unit 101-6 instructs the event notification determination unit 101-2 to perform the initializing process at the recovery. The event notification determination unit 101-2 acquires the event notification setting information and the internal state from the event notification determination unit 101-2 of the operative event detection device 101, and recovers the state inside (steps S701 and S702).

During the process, since the generated data is transmitted from the data generation unit 104, the event notification determination unit 101-2 buffers the generated data. Then, after the event notification setting information and the internal state have been recovered, the event notification determination unit 101-2 sequentially processes the generated data (step S703).

Afterwards, the event detection device 101 continues the operation as a standby system (step S704).

The description of the second embodiment is based on two event detection devices 101 #1 and #2, but similar operations may be performed by three or more devices.

Figure 12:
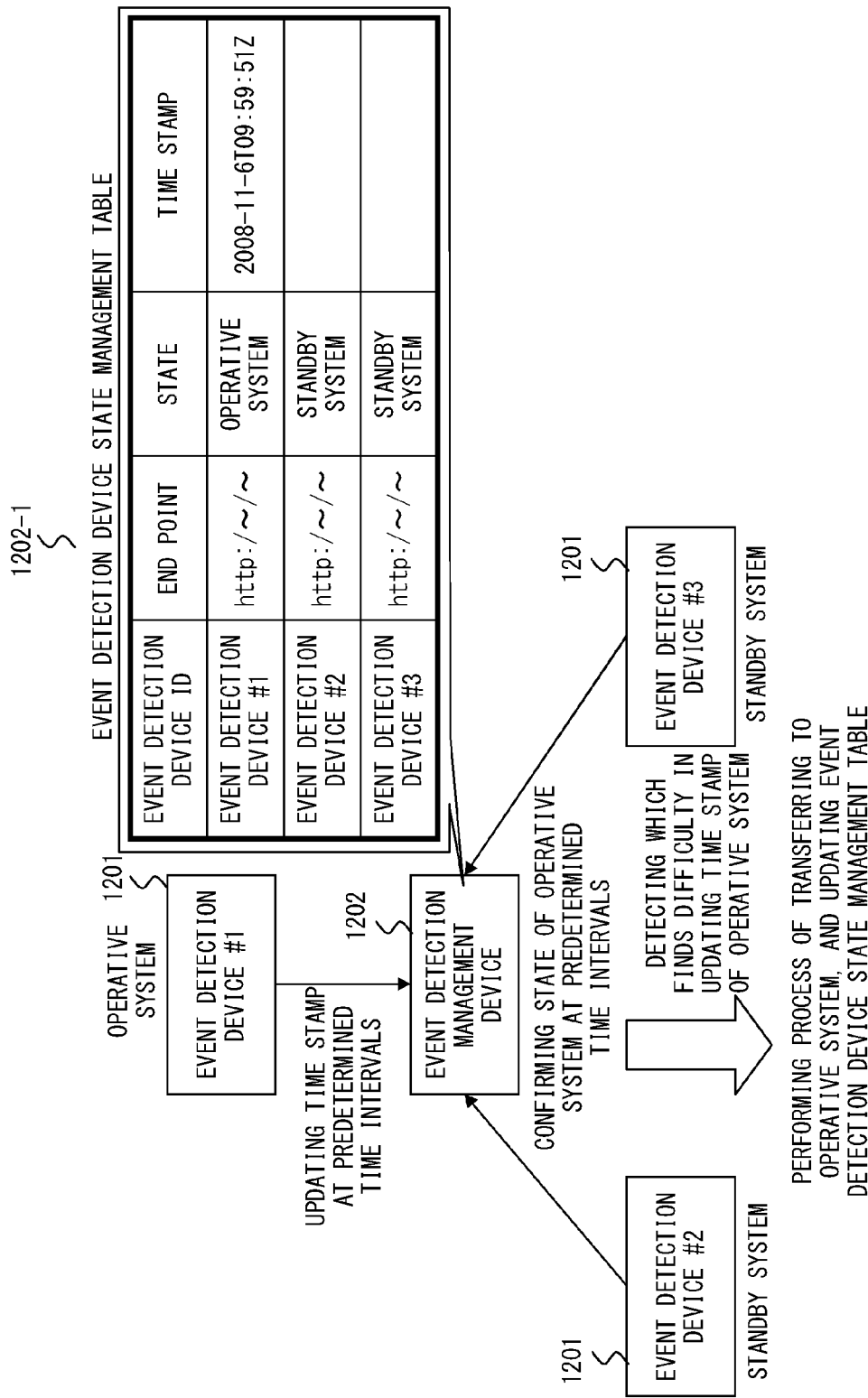
FIG. 12 is an example of a redundant configuration of three or more event detection devices.

In this case, for example, as illustrated in FIG. 12, an event detection management device 1202 manages the state of each event detection device 1201 (three devices #1 through #3 in FIG. 12) using the event detection device state management table. Each entry of the table are an event detection device ID, an end point, a state (operative system or standby system), and a time stamp.

The operative event detection device 1201 accesses the event detection management device 1202 at predetermined time intervals and updates the item "time stamp" of the entry corresponding to the own event detection device in the event detection device state management table. The standby event detection device 1201 periodically accesses the event detection management device 1202, and confirms that the time stamp of the entry in which the item "state" indicates "standby system" has been updated.

The standby event detection device 1201 that has detected difficulty in update determines that an abnormal condition has occurred in the operative event detection device 1201, and performs the process of transfer to an operative system as described above. Then, the event detection device 1201 accesses the event detection management device 1202, and changes the item "state" of the event detection device 1201 in which an abnormal condition has occurred to "standby system" in the event detection device state management table, and changes the item "state" of the own event detection device to "operative system" in the event detection device state management table. Afterwards, the event detection device 1201 that has entered the operative system periodically updates the time stamp.

All standby event detection devices 1201 can be informed of the state of the operative event detection device 1201.

Upon receipt of an event notification setting request from an application, the operative event detection device 1201 acquires the end point of the other standby event detection devices 1201 by referring to the event detection device state management table. The operative event detection device 1201 transmits the event notification setting information to each standby event detection device 1201.

When the event detection device 1201 in which an abnormal condition has occurred is recovered, the endpoint of the operative event detection device 1201 is acquired with reference to the event detection device state management table so that the event notification setting information and the internal state can be acquired.

In the above-mentioned first and second embodiments, the operative event detection device 101 transmits all event messages, and the standby event detection device 101 is control so that the device cannot transmit any event message.

However, as event notification settings from the application 103 increase, the load of transmitting event messages also increases. Therefore, by sharing the process of transmitting event messages between an operative system and a standby system, the respective transmitting loads can be reduced. As described above, the process of detecting an event is similarly performed between the operative system and the standby system to maintain the same internal state.

Figure 13:
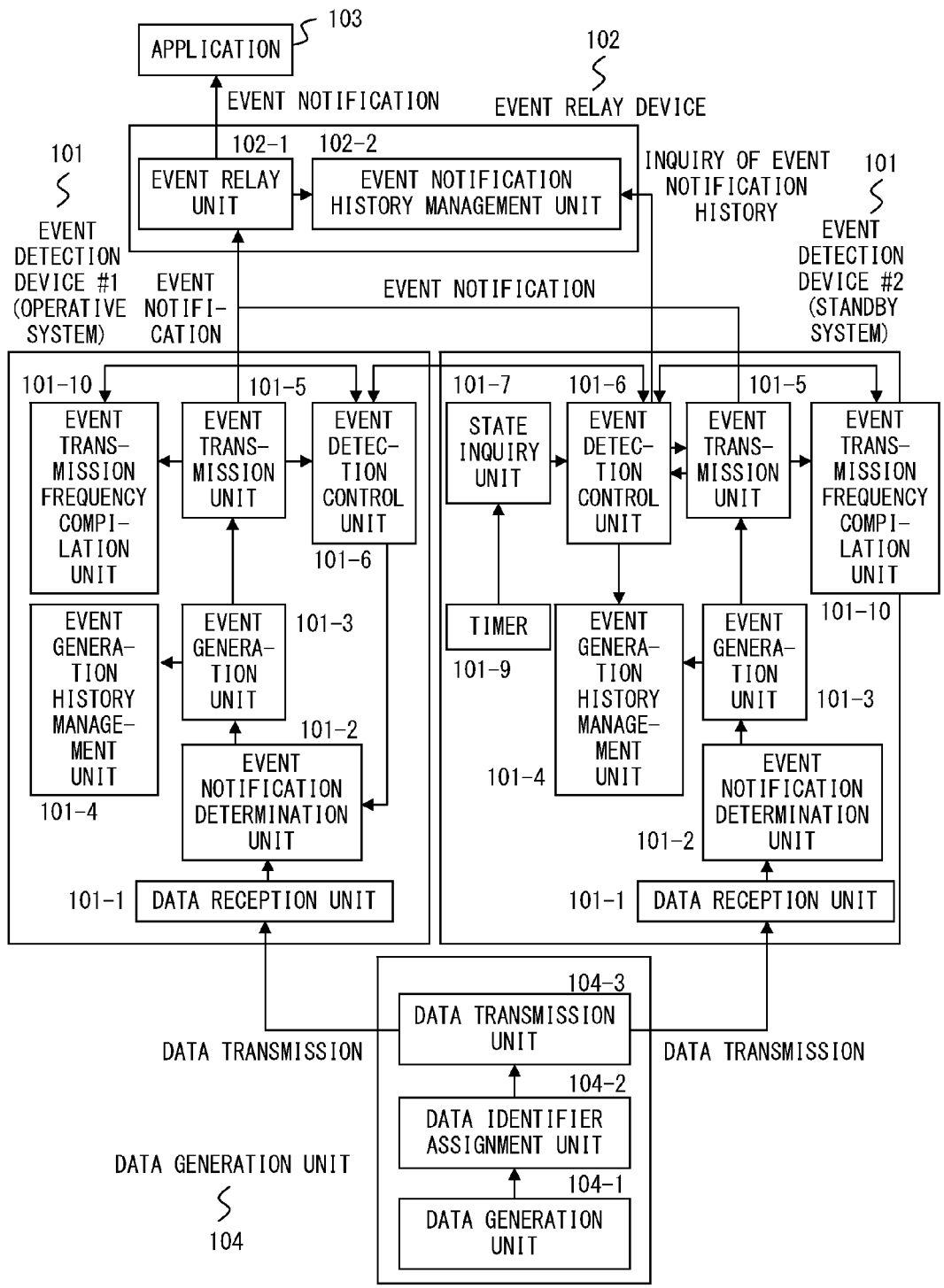
FIG. 13 is a configuration according to the third embodiment of the event detection system.
Figure 14:
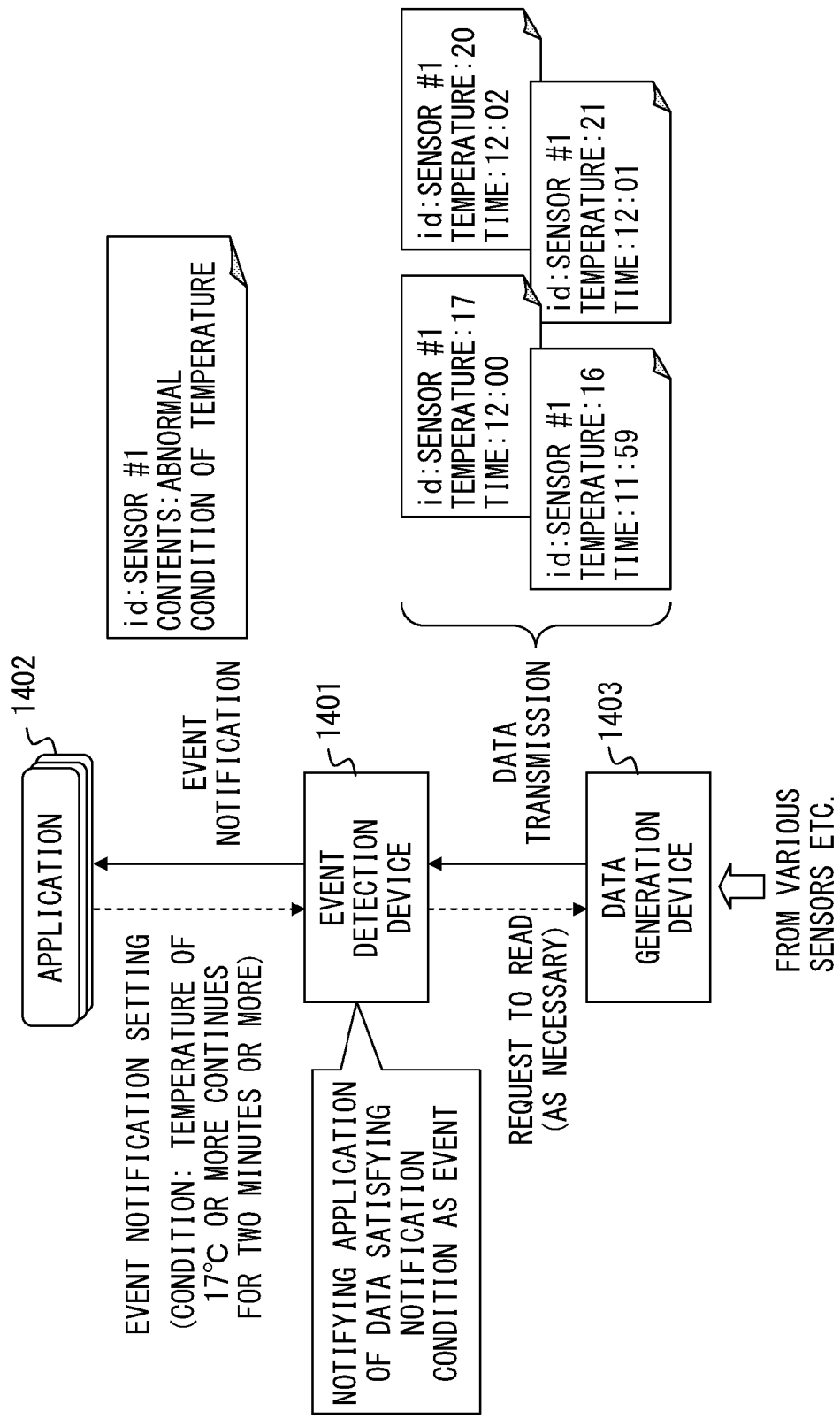
FIG. 14 is an example of a configuration of a common event detection device.
Figure 15:
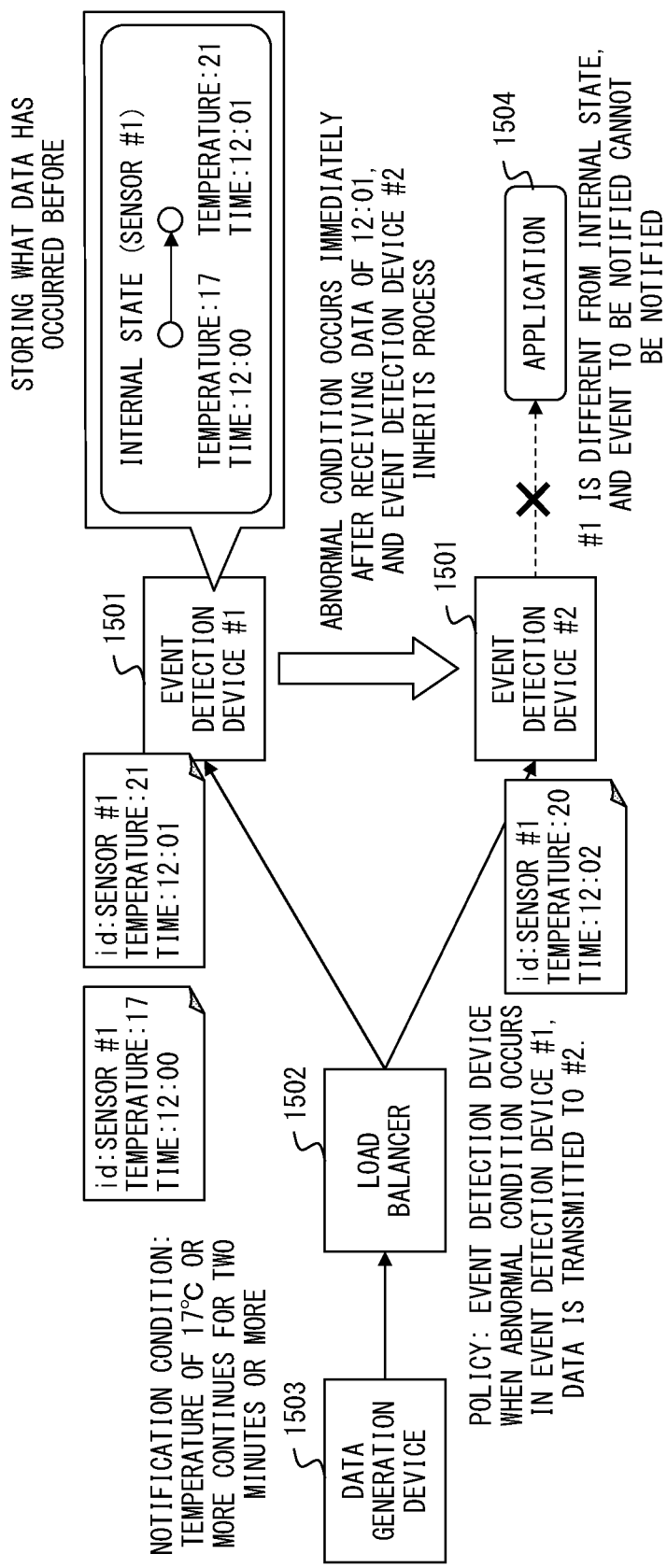
FIG. 15 is a configuration of a conventional event detection system using a load balancer.
Figure 16B:
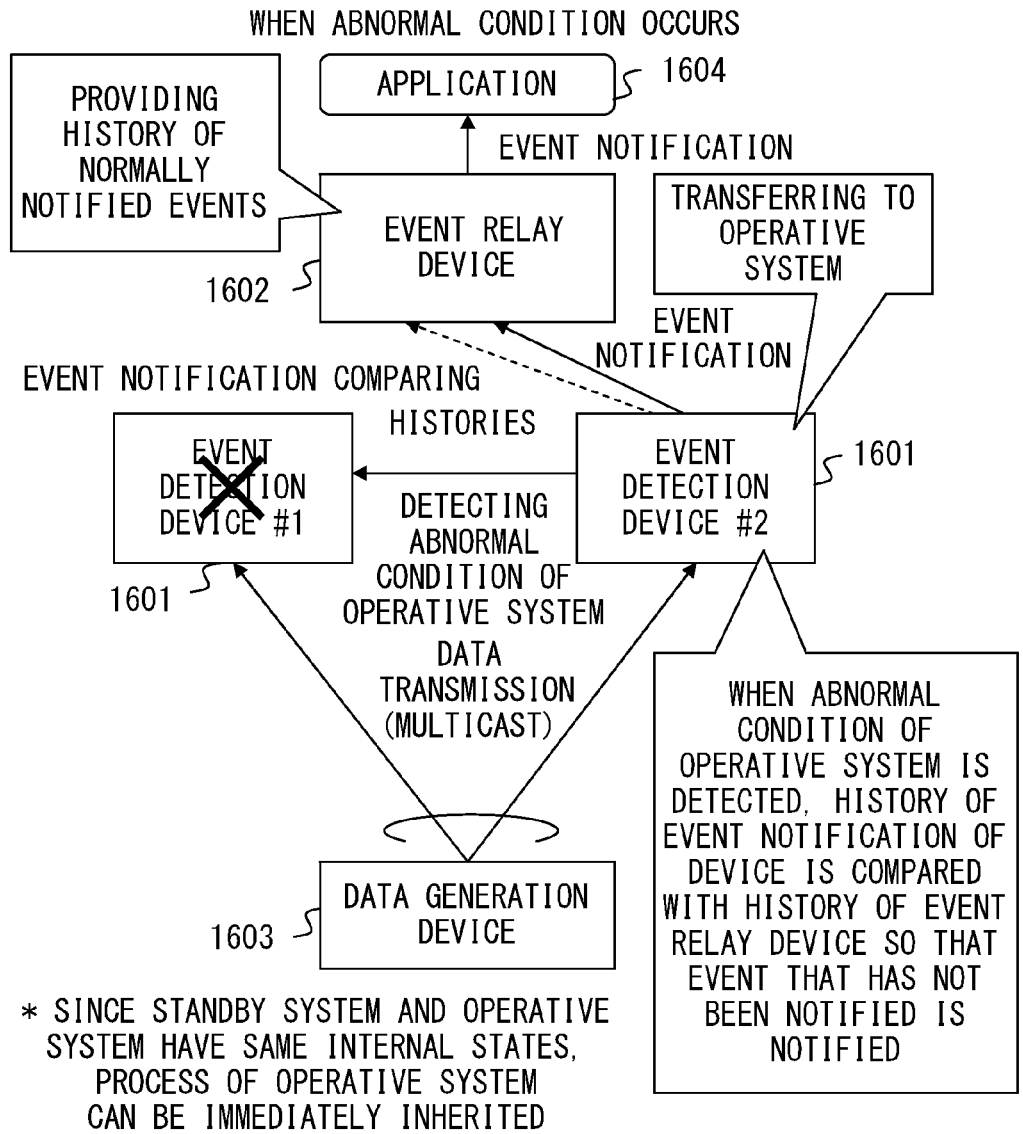
FIG. 16B is a configuration of another conventional event detection system when the standby event detection device detects an abnormal condition.
Figure 17A:
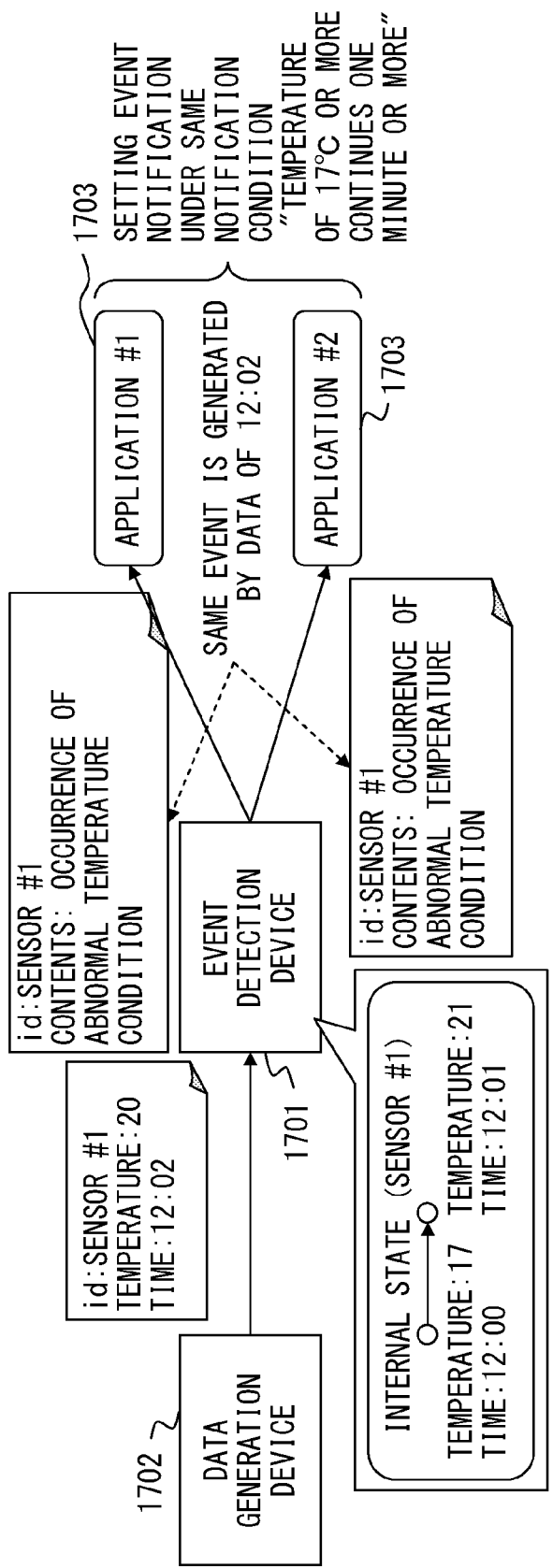
FIG. 17A is an explanatory view of the problem with identification of an event in event notification when an applications #1 and #2 set an event notification.
Figure 17B:
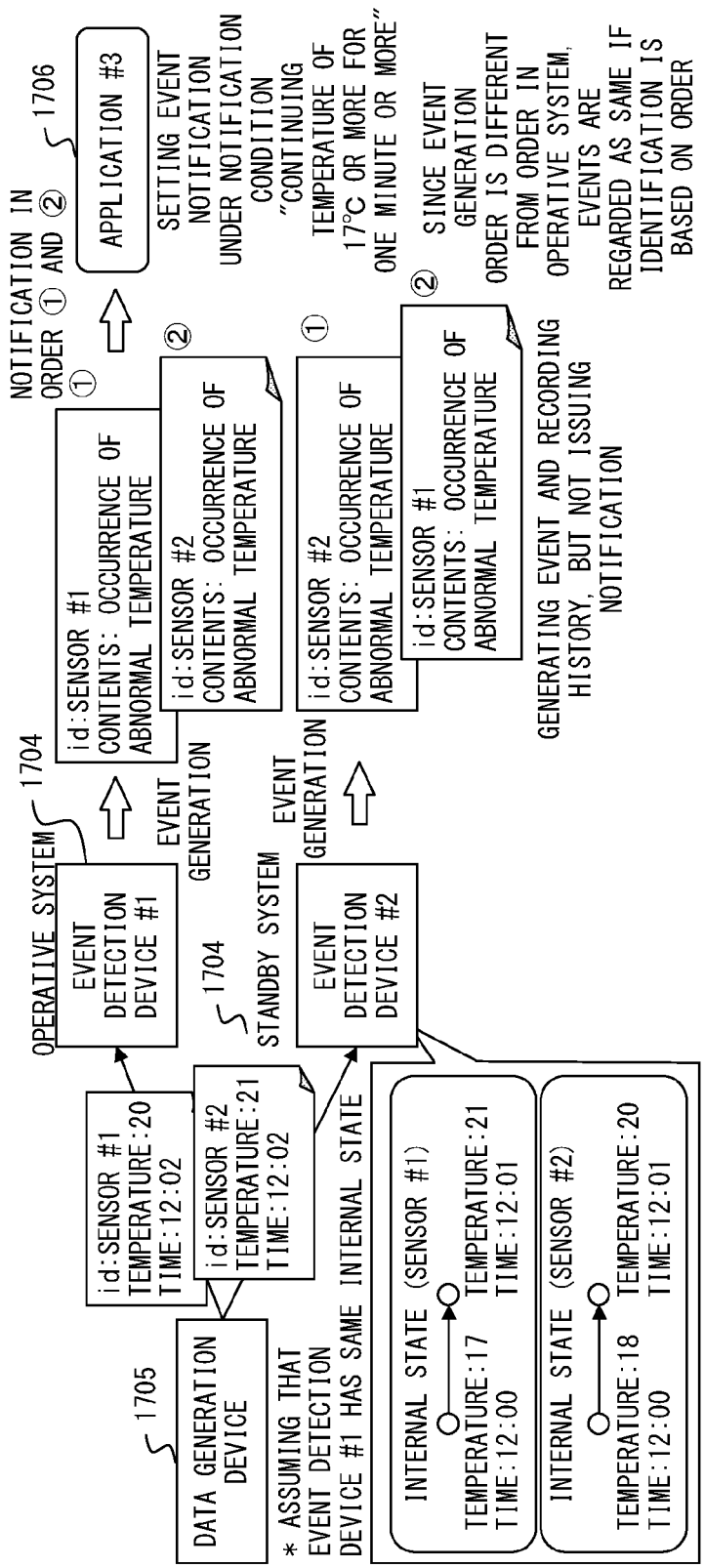
FIG. 17B is an explanatory view of the problem with identification of an event in event notification when an application #3 sets an event notification.

FIG. 13 is the configuration of the third embodiment of the event detection system for realizing the above-mentioned functions. In FIG. 13, the portion corresponding to the processing unit illustrated in FIG. 1 or FIG. 3 is assigned the same reference numeral.

In the configuration in FIG. 13, in addition to the configuration in FIG. 1 or FIG. 3, an event transmission frequency compilation unit 101-10 is provided in the event detection device 101, and the event detection control unit 101-6 in the event detection device 101 cooperates with the event detection control unit 101-6 in the other event detection device 101 on the basis of the compilation result of the event transmission frequency compilation unit 101-10.

The event transmission frequency compilation unit 101-10 comprise the function of compiling the frequency of event transmission actually performed by the event transmission unit 101-5 for each event notification setting. When the total transmission frequency exceeds a predetermined threshold, the event transmission frequency compilation unit 101-10 notifies the event detection control unit 101-6 of the information.

The event detection control unit 101-6 manages as to which event notification is to be made, and when the increase of transmission frequency is notified, the event detection control unit 101-6 of another event detection device 101 is requested to share a part of event transmission. Upon receipt of the request, the event detection control unit 101-6 of the other event detection device 101 acquires the state of the event transmission frequency of the own event detection device from the event transmission frequency compilation unit 101-10 in the own event detection device, determines the event notification to be shared, and answers the event detection control unit 101-6 of the requester about the share.

When the event transmission unit 101-5 transmits an event message, the unit inquires of the event detection control unit 101-6 whether the own event detection device is an operative system or a standby system in the first or second embodiment. On the other hand, in the third embodiment, the event transmission unit 101-5 indicates an event notification setting ID to the event detection control unit 101-6, and inquires whether or not the current event message is to be transmitted.

The process to be performed when an abnormal condition occurs in one event detection device 101, and another event detection device 101 inherits one event detecting and notifying process is the same as the process in the first or second embodiment.

According to the technology to be disclosed, when an event detection device is to be a redundant system, an event generated although the event detection device is different can be uniquely identified by an event identifier. Thus, the event notifying process can be passed from an operative system to a standby system without omitting an event notification among a plurality of event detection devices. As a result, the reliability of event detection can be improved.

The technology to be disclosed can be used for a system for performing a remote monitoring process by collecting various sensor data as an event from the data generation device connected over a network such as the Internet.

All examples and connectional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event detection control method, comprising:
   a comparing step of comparing generated data from a data generation device with event notification setting information preset by an application and including a notification condition and notification contents;
   a notifying step of notifying the application of an event message indicating the notification contents when the generated data satisfies the notification condition by a redundant configuration of a plurality of event detection devices including an operative system and a standby system;
   a data identifier assigning step of assigning to the generated data a data identifier for identification of an order of generating the generated data in the data generation device;
   an event message generation control step of redundantly performing using each event detection device an operation of determining whether or not generated data satisfies a notification condition of event notification setting information corresponding to an internal state for each internal state determined by a combination of the event notification setting information and the generated data, generating an event message including an event identifier uniquely determined from the internal state and the data identifier of the generated data when the condition is satisfied, and holding a generation history of the event message, the event identifier including an identifier of the internal state and the data identifier of the generated data;

an event message transmission control step of transmitting the event message from an operative event detection device to the application, and holding a transmission history of the event message by a device different from the operative event detection device; and an abnormal condition control step comparing an event identifier of an event message and a time stamp in the generation history held by the standby event detection device with an event identifier of an event message and a time stamp in the transmission history when the standby event detection device detects an abnormal condition of the operative event detection device, thereby transmitting an event message that has not been transmitted by the operative event detection device through the standby event detection device, and allowing the standby event detection device to transfer from the standby event detection device to an operative system.

2. The method according to claim 1, further comprising a recovery step of copying an internal state of the event detection device which has newly entered an operative system to the reactivated event detection device when the event detection device in which the abnormal condition has been detected is reactivated, and starting an operation of the event detection device as a standby system.

3. The method according to claim 1, wherein the plurality of event detection devices perform a cooperation as the operative event detection devices.

4. An event detection control system, comprising:
a comparing unit to compare generated data from a data generation device with event notification setting information preset by an application and including a notification condition and notification contents;
a notifying unit to notify the application of an event message indicating the notification contents when the generated data satisfies the notification condition by a redundant configuration of a plurality of event detection devices including an operative system and a standby system;
a data identifier assignment unit provided in the data generation device, and to assign to the generated data a data identifier for identification of an order of generating the generated data;

an event message generation control unit provided in the data generation device and redundantly to perform using each event detection device an operation of determining whether or not generated data satisfies a notification condition of event notification setting information corresponding to an internal state for each internal state determined by a combination of the event notification setting information and the generated data, generating an event message including an event identifier uniquely determined from the internal state and the data identifier of the generated data when the condition is satisfied, and holding a generation history of the event message, the event identifier including an identifier of the internal state of the data identifier of the generated data;

an event message transmission control unit to transmit the event message from an operative event detection device to the application, and to hold a transmission history of the event message by a device different from the operative event detection device; and an abnormal condition control unit to compare an event identifier of an event message and a time stamp in the generation history held by the standby event detection device with an event identifier of an event message and a time stamp in the transmission history when the standby event detection device detects an abnormal condition of the operative event detection device, thereby to transmit an event message that has not been transmitted by the operative event detection device through the standby event detection device, and to allow the standby event detection device to transfer from the standby event detection device to an operative system.

5. The system according to claim 4, further comprising a recovery unit to copy an internal state of the event detection device which has newly entered an operative system to the reactivated event detection device when the event detection device in which the abnormal condition has been detected is reactivated, and to start an operation of the event detection device as a standby system.

6. The system according to claim 4, wherein a plurality of event detection devices perform a cooperation as the operative event detection devices.

* * * * *